United States Patent [19]

Fuji et al.

[11] Patent Number: 4,591,720

[45] Date of Patent: May 27, 1986

[54] METHOD OF MEASURING RADIOACTIVITY

[75] Inventors: Masaaki Fuji, Katsuta; Yuichi Izumi, Sendai; Hiroshi Kitaguchi, Naka, all of Japan

[73] Assignee: Hitachi, Ltd., Tokyo, Japan

[21] Appl. No.: 555,613

[22] Filed: Nov. 28, 1983

[30] Foreign Application Priority Data

Nov. 27, 1982 [JP] Japan ................. 57-207967

[51] Int. Cl.⁴ ................................. G01T 1/20
[52] U.S. Cl. ..................... 250/362; 250/369
[58] Field of Search ............ 250/363 S, 363 R, 362, 250/370 F, 369, 363 SR; 378/6, 50, 54

[56] References Cited

U.S. PATENT DOCUMENTS 3,412,249 11/1968 Hanken ................. 378/50
3,876,882 4/1975 Todd ................. 250/369
4,081,682 3/1978 Ohlenshläger ............ 250/363 R
4,342,916 8/1982 Jatteau et al. ............ 378/6
4,423,522 12/1983 Harding ................. 378/6
4,453,075 6/1984 Mattsson et al. ............ 250/363 S Primary Examiner—Alfred E. Smith
Assistant Examiner—R. Hanig
Attorney, Agent, or Firm—Antonelli, Terry & Wands

[57] ABSTRACT

The present invention relates to a method of measuring radioactivity which is suitable for discriminating between surface and internal contaminations of a body.

The radioactivity of a subject is measured to obtain a γ-ray energy spectrum of radioactivity signals obtained thereby, and a discrimination between surface and internal contamination of the subject is performed on the basis of the ratio between a photoelectric effect component and a Compton-scattered component of the γ-ray energy spectrum.

According to the present invention, surface and internal contaminations can be clearly identified.

20 Claims, 23 Drawing Figures

| PHOTOELECTRIC PEAK ENERGY (E) | RADIOACTIVE NUCLIDES |
|---|---|
| 1.17 MeV<br>1.33 MeV | $^{60}Co$ |
| 0.662 MeV | $^{137}Cs$ |
|  |  |
|  |  |

METHOD OF MEASURING RADIOACTIVITY

BACKGROUND OF THE INVENTION

The present invention relates to a method of measuring radioactivity and, more particularly, to a method of measuring radioactivity which is suitable for discriminating between surface and internal contaminations of a body.

In the prior art, the quantity of radioactive substances taken into a human body is measured by bioassay or by a human counter. The former is a method by which the total quantity of radioactive substances in the body is deduced from the quantity of radioactive substances contained in the breath or urine, and the latter is a method by which the total quantity of radioactive substances in the body is measured by a plurality of radiation detectors positioned outside the body. In either method, the total quantity of radioactive substances within the body at the time of measurement is measured. However, neither method can discriminate which region has been contaminated by the radioactivity.

SUMMARY OF THE INVENTION

An object of the present invention is to provide a method measuring radioactivity which can discriminate very accurately between internal and surface contaminations of the human body.

According to one aspect of the present invention, in order to accomplish the above object, the radioactivity of a subject is measured to obtain a γ-ray energy spectrum of radioactivity signals obtained thereby, and a discrimination between surface and internal contamination of said subject is performed on the basis of the ratio between a photoelectric effect component and a Compton-scattered component of said γ-ray energy spectrum.

According to another aspect of the present invention, the radioactivity of a subject is measured to obtain a γ-ray energy spectrum of radioactivity signals obtained thereby, and a discrimination between surface and internal contamination of said subject is performed on the basis of the ratio between a photoelectric effect component and a Compton-scattered component of said γ-ray energy spectrum so that the internal exposure dose of said subject can be determined in the case of internal contamination.

DETAILED DESCRIPTION OF THE PREFERRED EMBODIMENTS

Figure 1:
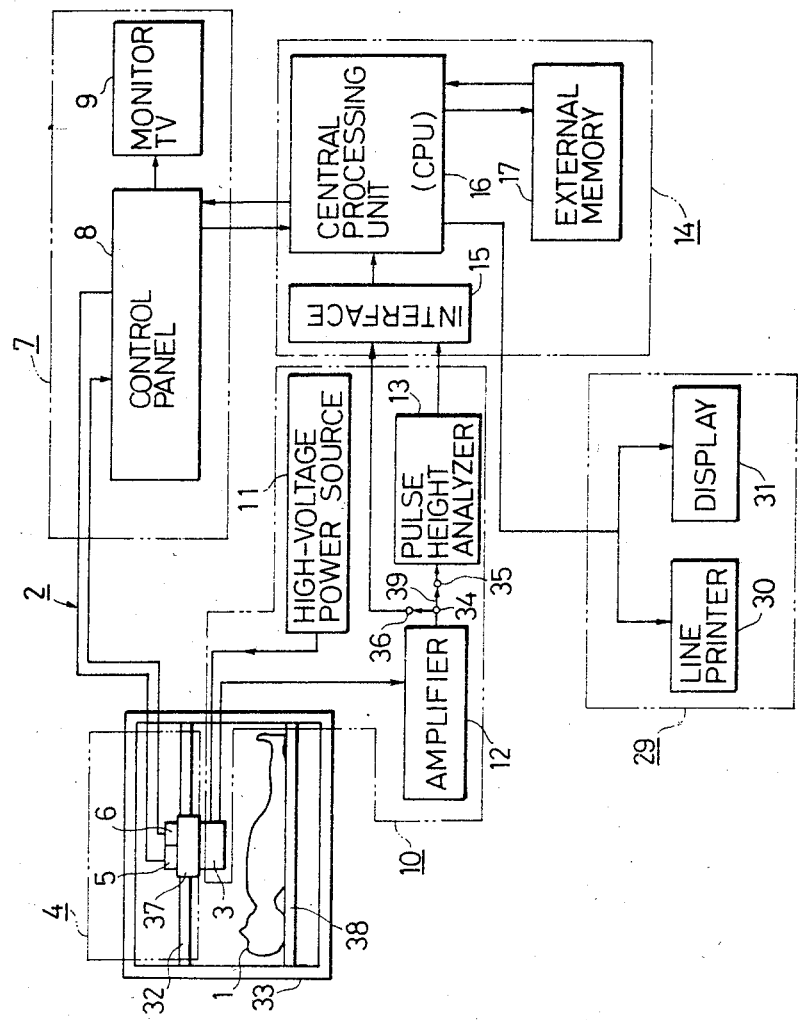
FIG. 1 is a block diagram of the apparatus for measuring radioactivity according to one preferred embodiment of the present invention.
Figure 2:
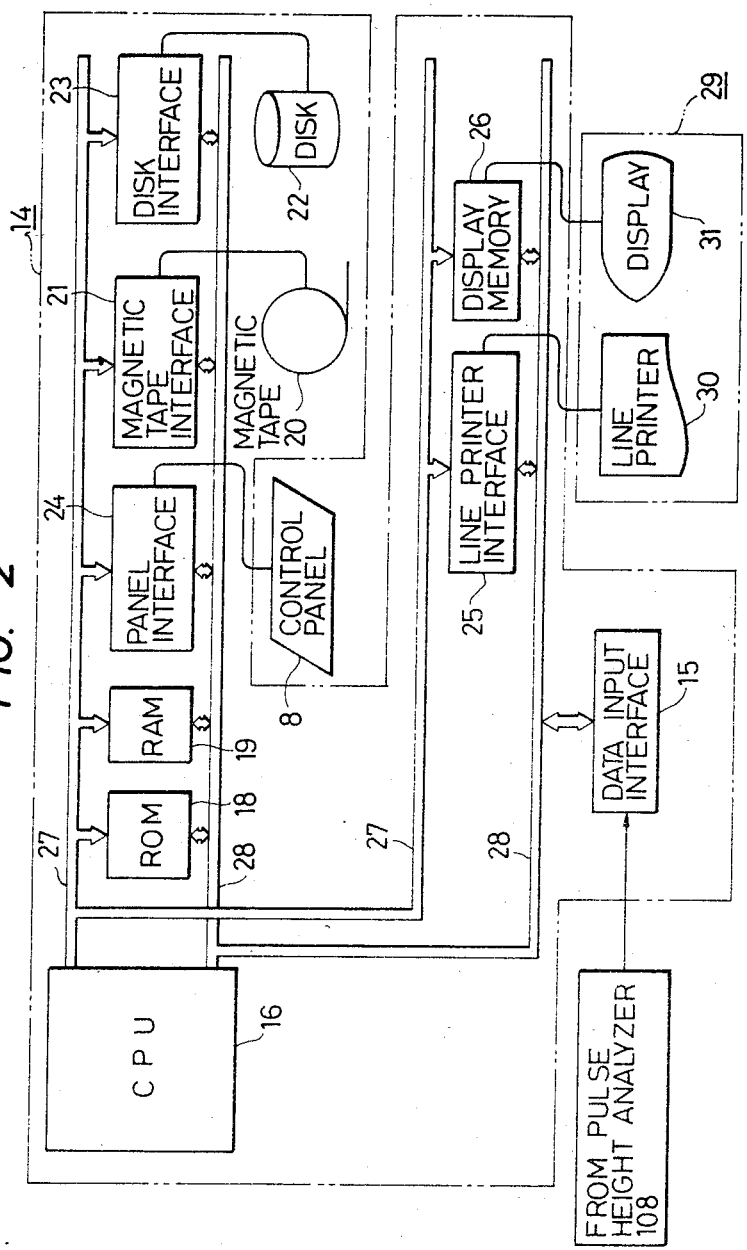
FIG. 2 is a detailed block diagram of the computational unit of FIG. 1.

An apparatus for measuring radioactivity according to one preferred embodiment of the present invention will now be described with reference to FIGS. 1 and 2.

A radioactivity meter 2 is composed of a support frame 33 supporting a bed 38 on which a subject 1 lies, a drive unit 4, a control unit 7, a metering unit 10, a computational unit 14, and a display unit 29.

The drive unit 4 is equipped with a radiation detector 3, a drive mechanism 5, a position detector 6, and a truck 37. The truck 37 is mounted on a guide rail 32 attached to the support frame 33 so that it can move along the guide rail 32. The drive mechanism 5 is carried on the truck 37. The guide rail 32 extends along the longitudinal direction of the subject 1. The guide rail 32 is equipped with a rack (not shown) which is in meshing engagement with a pinion mounted in the drive mechanism 5 (not shown). The drive mechanism 5 is equipped with a motor (not shown) which is connected through a reduction gear mechanism to the pinion. The radiation detector 3 and the position detector 6 are carried on the truck 37. The radiation detector 3 has a width equal to the breadth of the shoulders of the subject 1. The support frame 33 is surrounded by radiation shielding (not shown).

The control unit 7 is equipped with a control panel 8 and a monitor TV 9. The control panel 8 transmits operational instructions to the drive mechanism 5 to move the drive mechanism 5 along the guide rail 32 to a predetermined position. The monitor TV displays both an output signal from the position detector detecting the position of the radiation detector 3, the operational state of the truck 37, etc.

The metering unit 10 is equipped with the radiation detector 3, a high-voltage power source 11, an amplifier 12, and a peak analyzer 13. The high-voltage power source 11 applies a high voltage to the radiation detector 3 to operate it. The radiation detector 3 detects the radioactivity of the subject 1. A signal output from the radiation detector 3 is amplified by the amplifier 12. The amplifier 12 is connected to the peak analyzer 13 and a data input interface 15 by connectors 34 and 39, respectively. The peak analyzer 13 determines the peak values of the γ-ray energy spectrum of the input signal.

The computational unit 14 is equipped with the data input interface 15, a central processing unit 16, and an external memory 17. The data input interface 15 transmits the pulse height values of the γ-ray energy spectrum, i.e., the signals output from the pulse height analyzer 13, to the central processing unit 16. The external memory 17 is composed of a ROM (Read Only Memory) 18, a RAM (Random Access Memory) 19, a magnetic tape 20, and a disk 22. An address bus 27 and a data bus 28 are connected to the central processing unit 16. The ROM 18, the RAM 19, a magnetic tape interface 21, a disk interface 23, a panel interface 24, a line printer interface 25, and a display memory 26 are connected to both the address bus 27 and the data bus 28. The magnetic tape 20 is connected to the magnetic tape interface 21, and the disk 22 is connected to the disk interface 23.

The ROM 18 holds arithmetic programs such as a program for determining radioactive nuclides from photoelectric peak energy, a program for computing the index for the γ-ray energy spectrum, a program for discriminating between contaminations, or the program of the method of measuring radioactivity according to the present embodiment which determines the superficial and internal contaminations (to be described hereinafter), and also the internal exposure dose. The RAM 19 holds numerical data necessary for the computations such as data for identifying radioactive nuclides and for contamination discrimination, and maintains a working area. The control panel 8 of the control unit 7 is connected to the panel interface 24.

The display unit 29 is equipped with a line printer 30 and a display 31. The line printer 30 and display 31 are connected to the line printer interface 25 and the display memory 26, respectively.

Figure 3:
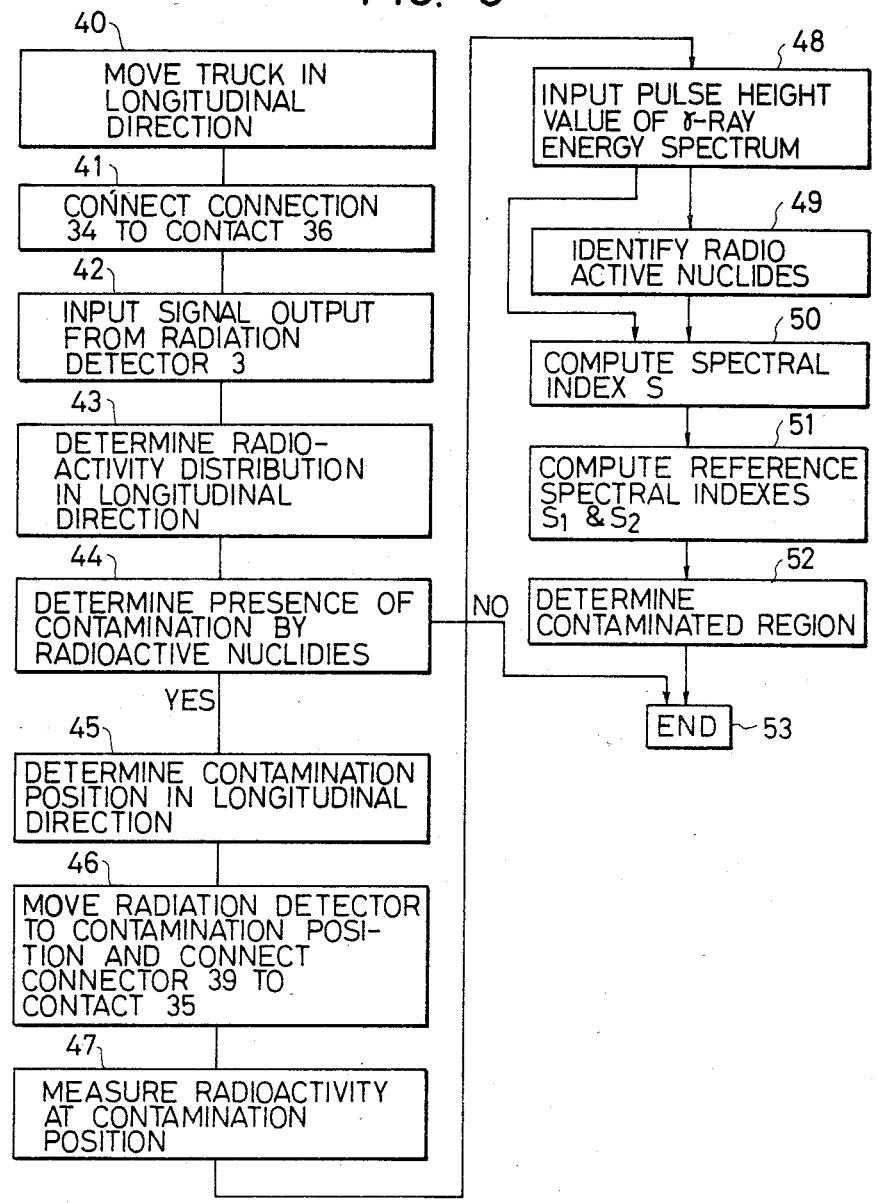
FIG. 3 is a flow chart showing the procedure of the discrimination between internal and surface contaminations executed in the central processing unit of FIG. 1.
Figure 4:
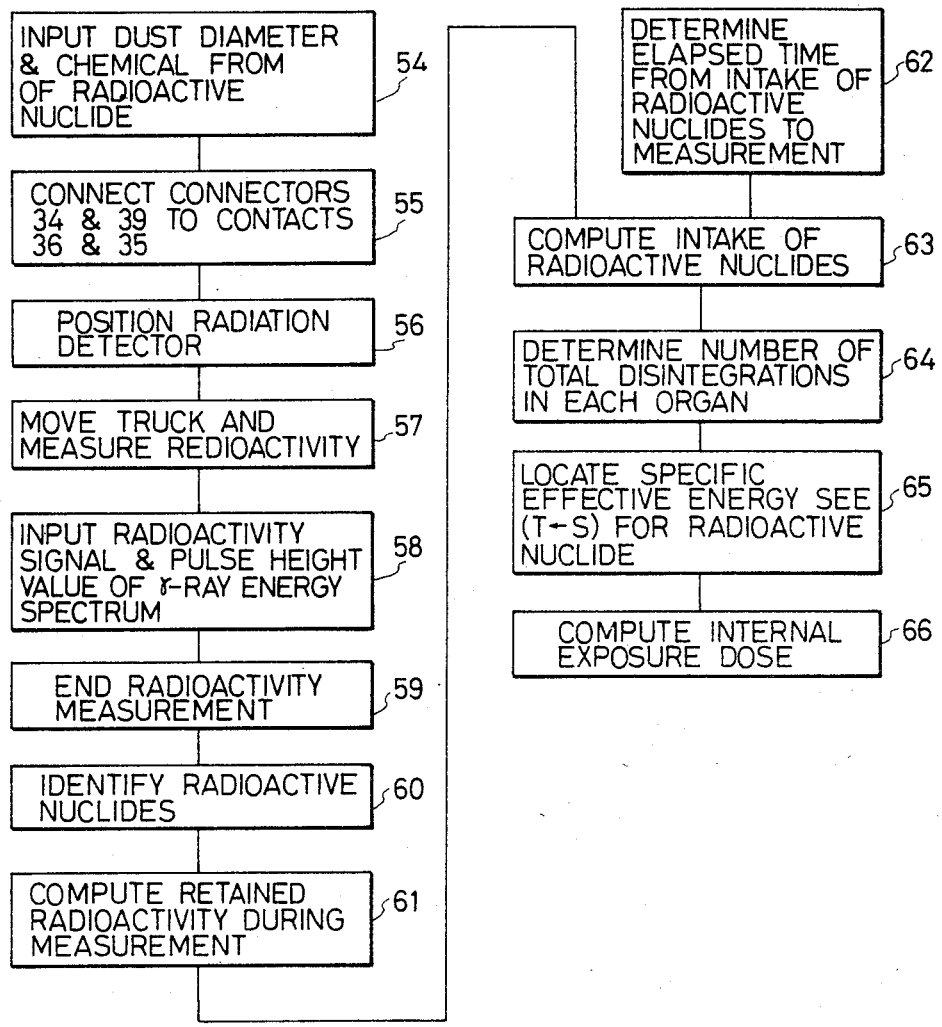
FIG. 4 is a flow chart of the procedure of the computation of the internal exposure dose executed in the central processing unit of FIG. 1.
Figures 5, 6:
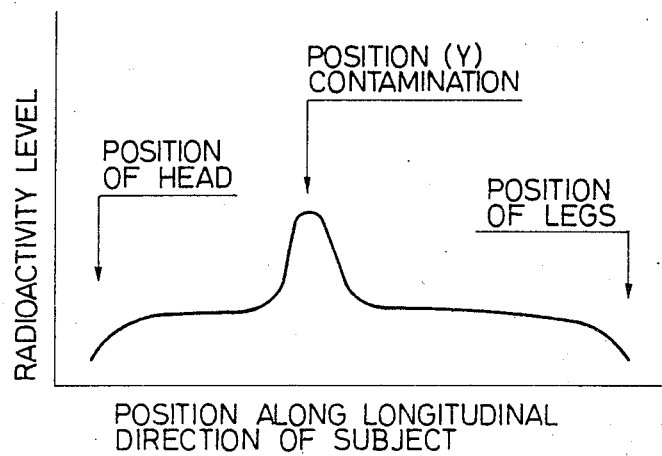
FIG. 5 is a sample graph of the radioactivity distribution in a subject, taken in the longitudinal direction.
FIG. 6 is a table of photoelectric peak energies of radioactive nuclides.

The measurement of the radioactivity of the subject 1 by the radioactivity meter 2 of the construction thus far described will be explained below with reference to FIGS. 3 and 4. The subject lies on the bed 3. The operator pushes a first start button of the control panel 8 to measure the radioactivity. This instruction is transmitted through the panel interface 24 to the central processing unit 16 which calls up a program stored in the ROM 18, as shown in FIG. 3, and executes the operations and computations necessary for the measurement of the radioactivity of the subject 1 in accordance with that program. The central processing unit 16 sends an instruction through the panel interface 24 and the control panel 8 to the drive mechanism 5 to move the truck 38 along the guide rail 32 (Step 40). Simultaneously with this, the central processing unit 16 sends a signal to the connector 34 to connect the amplifier 12 and a contact 36 (Step 41). The connector 39 is disconnected from a contact 35. The radiation detector 3 measures the radioactivity of the subject 1 in the longitudinal direction in accordance with the movement of the truck 37. The signal output from the radiation detector 3 is amplified by the amplifier 12 and then input through the data input interface 15 to the central processing unit 16 (Step 42), and is stored on the magnetic tape 20 or the disk 22. When the radioactivity measurement has ended, the radioactivity level distribution in the longitudinal direction of the subject 1 is determined (Step 43). The result is similar to that shown in FIG. 5, and is displayed on the display 31. A peak (Y) occurs for the position which is contaminated by radioactive substances, as shown in FIG. 5. When there is contamination at several positions, there will be a plurality of peaks. Since the subject 1 undergoes the examination within a compartment surrounded by radiation shielding, as has been described before, the measurement results are barely influenced by external radioactivity. The influence of external radioactivity is measured separately and compensated for. The presence of radioactive substances in the subject 1 is determined on the basis of the radioactivity level distribution obtained (Step 44). Specifically, this judgement is conducted by comparing a predetermined value of normal radioactivity of the subject 1 with the measured value of radioactivity. When the latter value is no more than the former, the subject is judged to be uncontaminated by radioactive substances, and the examination is then ended (Step 53).

When the latter value exceeds the former, the subject is judged to be contaminated by radioactive substances, and a further examination is conducted, as will be described in the following. First of all, the position of contamination (Y) in the longitudinal direction of the subject 1 is determined on the basis of both the characteristics of the radioactivity level distribution shown in FIG. 5 and the signal output from the position detector 6, which was detected during the radioactivity measurement (Step 45). The radiation detector 3 is moved to the determined contamination position (Y), and the connector 39 is connected to the contact 35 (Step 46). At the same time, the connector 34 and the contact 36 are disconnected from each other. A measurement of the radioactivity at the contamination position (Y) is started (Step 47). A signal output from the radiation detector 3 is sent by way of the amplifier 12 to the pulse height analyzer 13. This pulse height analyzer 13 analyzes the pulse height of the input signal to output a pulse height distribution of the γ-ray energy spectrum. This pulse height distribution of the γ-ray energy spectrum is taken from the data input interface 15 to the central processing unit 16 and is then stored on the disk 22 (or the magnetic tape 20) (Step 48). When the measurement by the radiation detector 3 has ended, the subject 1 can get off the bed 38. After that, the following processings are conducted in the computational unit 14. A pulse height distribution of a γ-ray energy spectrum always has a set of a photoelectric peak component P and a Compton component C corresponding to each radioactive nuclide. When a plurality of radioactive nuclides are present, the number of photoelectric peak components P or Compton components C that appear is equal to that of the radioactive nuclides. The photoelectric peak component P is a quantity expressing the magnitude of the peak due to the photoelectric effect. The Compton component C is a quantity indicating the region of the pulse peak corresponding to a γ-ray whose energy has been attenuated by the Compton scattering S effect.

Figure 7:
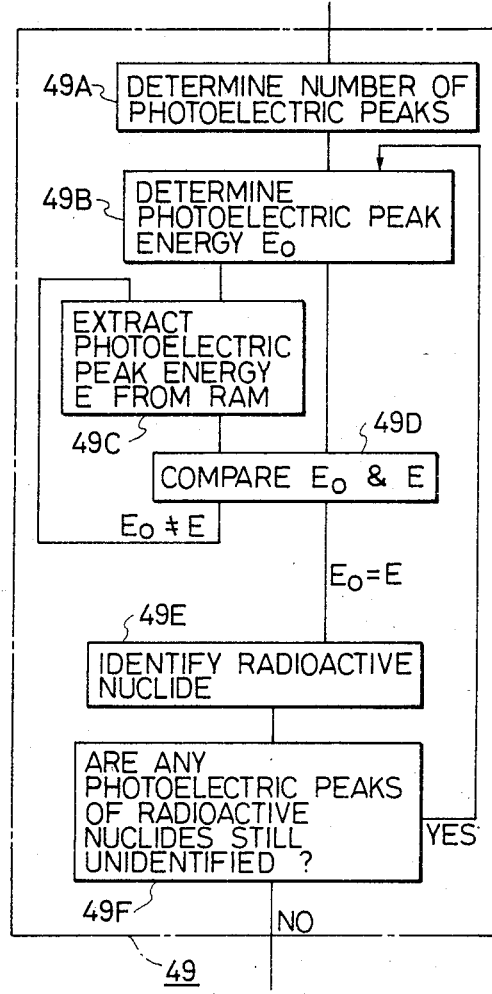
FIG. 7 is a flow chart of the procedure of determining the radioactive nuclides of FIG. 3.

Next, the determination of which radioactive nuclides have caused the radioactive contamination is conducted at Step 49. The process of determining the radioactive nuclides will be described in detail with reference to FIG. 7.

The peak distribution of the input γ-ray energy spectrum is read from the disk 22, and the number of photoelectric peaks is determined (Step 49A). The RAM 19 holds values of photoelectric peak energies E corresponding to all the radioactive nuclides, as shown in FIG. 6. The photoelectric peak energy E is determined to correspond to each of the radioactive nuclides. The photoelectric peak energy $E_0$ is determined from the pulse height distribution (i.e., the measured value) of the γ-ray energy spectrum extracted from the disk 22 (Step 49B), and is the maximum of the photoelectric peak components P. One value of the photoelectric peak energies E stored in the RAM 19 is extracted (Step 49C). The photoelectric peak energy $E_0$ and that photoelectric peak energy E are compared with each other (Step 49D). The radioactive nuclide acting as the source of contamination is identified when $E_0=E$ (Step 49E). That is to say, the radioactive nuclide corresponding to that photoelectric peak energy E is determined. When the values $E_0$ and E are different, the value of another photoelectric peak energy E is extracted, and the process of Step 49C is conducted again. This operation is repeated until $E_0=E$. After one radioactive nuclide has been identified, a decision is made as to whether there are photoelectric peaks for radioactive nuclides which have not been identified (Step 49F). When there is such a photoelectric peak, the processes of Steps 49A to 49F are repeated. (However, where there is a radioactive nuclide with a plurality of photoelectric peaks, such as $^{60}$Co, the number of repetitions is reduced accordingly.) These processes are repeated according to the number of photoelectric peaks, so that a number of radioactive nuclides equal to that of photoelectric peaks is selected. The names of the radioaactive nuclides identified are stored on the disk 22.

Figure 8:
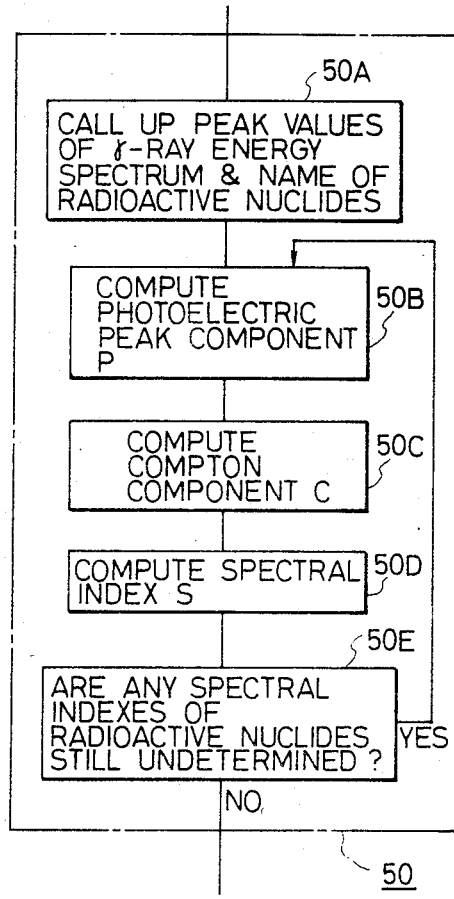
FIG. 8 is a flow chart of the procedure of computing the spectral index S of FIG. 3.

When all the radioactive nuclides providing the source of contamination have been identified, spectral index is computed (Step 50). The computation of the spectral index will be described with reference to FIG. 8. The pulse height value of the γ-ray energy spectrum and the names of the radioactive nuclides, which are stored on the disk 22, are input to the central processing unit 16 (Step 50A). For each radioactive nuclide, the corresponding photoelectric peak component P is computed from the γ-ray energy spectrum (Step 50B), the Compton component C is determined (Step 50C), and then the spectral index S is determined (Step 50D). This spectral index S is obtained by the formula $S=C/P$. When there are a plurality of different radioactive nuclides acting as the source of contamination, the processes of Steps 50A to 50D are repeated according to the number of radioactive nuclides to determine the corresponding spectral indexes S. After the computation of Step 50D, more specifically, a decision is made as to whether any of the spectral indexes S of the radioactive nuclides has not yet been determined (Step 50E). When there is such a lack, the processes of Steps 50A to 50D are repeated. When it is judged at Step 50E that there is no radioactive nuclide without a spectral index S determined, the process of Step 50 ends.

Figure 9:
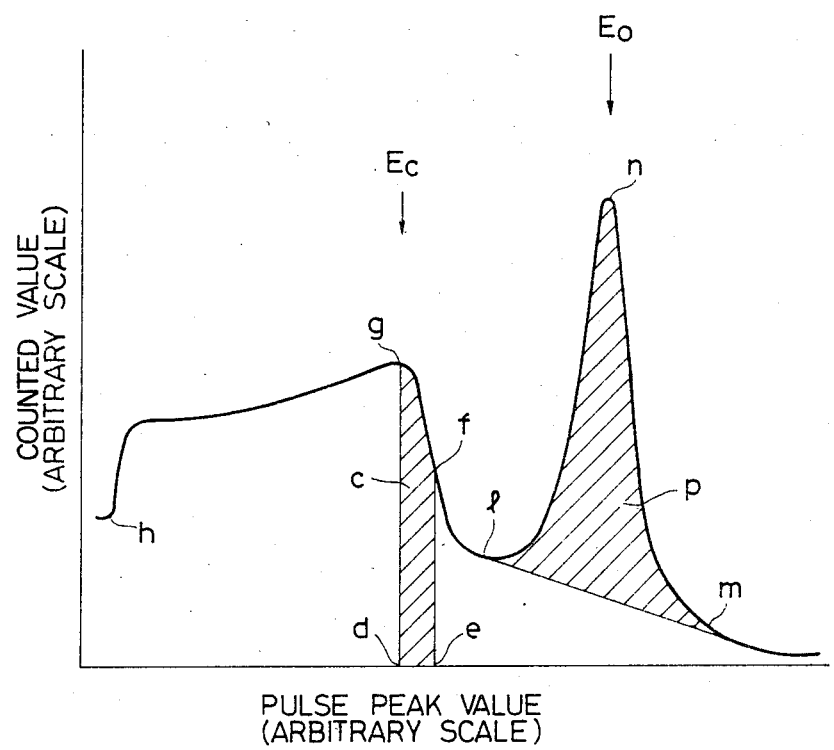
FIG. 9 is a sample graph of the peak distribution of the γ-ray energy spectrum which is the signal output from the peak analyzer of FIG. 1.

The computation of the spectral indexes S thus far described will now be explained in more detail in connection with the actual γ-ray energy spectrum shown in FIG. 9. FIG. 9 shows one example of the pulse height distribution of a γ-ray energy spectrum when a NaI (Tl) radiation detector is used as the radiation detector 3. The photoelectric peak component P is expressed by the area of the region extending above a straight line lm which connects a point l at the lower-energy side of the photoelectric peak and a point m at the higher-energy side of the photoelectric peak. In other words, the photoelectric peak component P is the hatched area surrounded by the lines connecting the points l, m, and n.

Compton scattering takes place within the body of the subject through which the γ-rays pass, and in the radiation detector 3 (e.g., the NaI (Tl) crystal of the NaI (Tl) radiation detector) through which the γ-rays pass. Compton scattering in the human body occurs in the region in which the pulse peaks are equal to or higher than a point h of FIG. 9. However, although the Compton component C can be determined in the region above point h, as will be described hereinafter, the region below a Compton edge energy $E_C$ includes γ-rays generated by Compton scattering within the radiation detector 3 so that the sensitivity is reduced. Consequently, it is desirable that the Compton component C is determined within a region above the Compton edge (point d). If point l is exceeded, moreover, the sensitivity is reduced by the influence of the photoelectric peak component P. Therefore the sensitivity of the Compton component C is improved if the positions at which the γ-rays incident on the radiation detector are emitted are within the region of pulse peaks between points d and l. This leads to a reduction of the counting time period. In the present embodiment, as shown in FIG. 9, the area of the γ-ray energy spectrum of the pulse peak width between point d and a point e at which a pulse peak value corresponds to a higher energy than that of point d, namely, the hatched area surrounded by the lines connecting points d, e, f and g, is used as the Compton component C. The energy $E_C$ at the Compton edge corresponding to point d has the relationship with the photoelectric peak energy $E_0$ which is expressed by the following equation (from "Radioactivity" by Iwao Ogawa, published by Corona KK in 1964):

$$E_C = \frac{E_0}{1 + \frac{0.2554}{E_0}} \quad (1)$$

The energy-resolving power of a NaI (Tl) radiation detector is about 9% for a NaI (Tl) crystal of a diameter of 3 inches and a thickness of 3 inches, for example. Therefore, the region of the pulse peaks when the Compton component C generated in the body of the subject is determined on the basis of the γ-ray energy spectrum, which is determined from the signal output from a NaI (Tl) radiation detector with a NaI (Tl) crystal of that size, may be located between the pulse peak values d and e corresponding to the energy values given by the following equations:

$$E_1 = \frac{E_0}{1 + \frac{0.2554}{E_0}} \quad (2)$$

and $$E_2 = (1 + 0.045) E_1 \qquad (3)$$

This effect is obtained by determining the Compton component within the region of pulse peak values on the higher-energy side of the Compton edge. Specifically, there is no noise component from the radiation detector 3 on the higher-energy side of the Compton edge, while there would be such noise component in the low-energy region. Moreover, the count of pulse peak values corresponding to the energies higher than the Compton edge energy $E_C$ does not contain γ-ray components in which the energy is attenuated by Compton scattering produced when the γ-rays pass through the NaI (Tl) crystal, but γ-ray components in which the energy is attenuated by Compton scattering produced as the γ-rays pass through the human body. As a result, when the Compton component is determined on the basis of the counted value in the region of these pulse peak values, the spectral index S obtained thereby varies more with changes in the depth of the contamination region than the spectral index S obtained by the Compton component C of another region.

Figure 10:
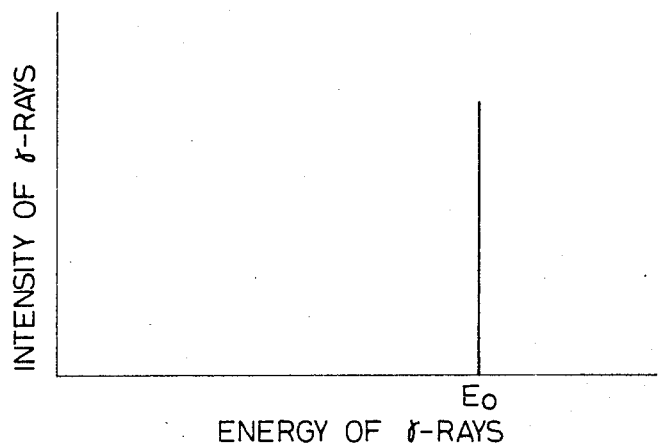
FIG. 10 is a characteristic graph of the energy of γ-rays input to the radiation detector.
Figure 11:
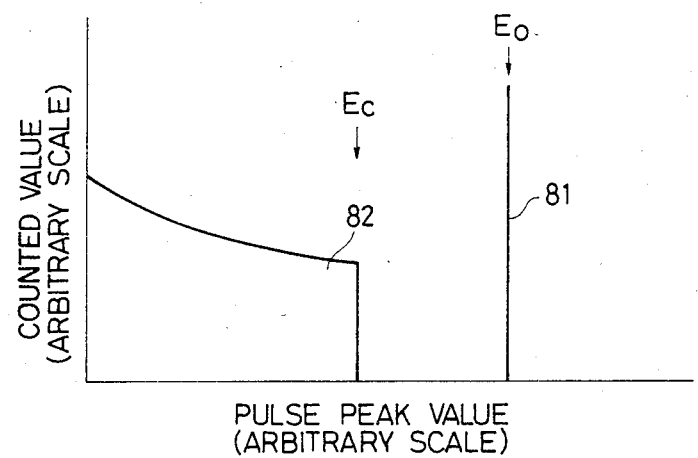
FIG. 11 is a characteristic graph showing the pulse peak distribution output from the radiation detector when the γ-rays of FIG. 10 are input.
Figure 12:
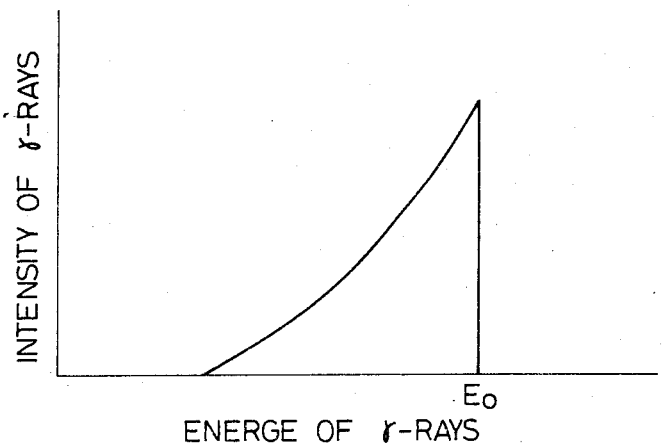
FIG. 12 is a characteristic graph of the energy distribution of γ-rays which have passed through the human body when the γ-rays of FIG. 10 are radiated onto the human body.
Figure 13:
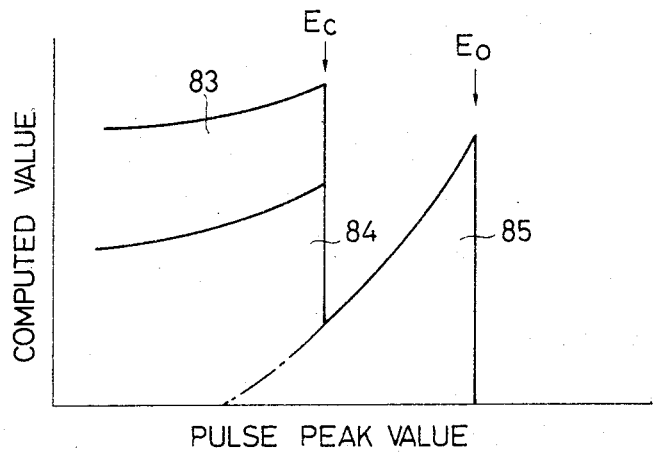
FIG. 13 is a characteristic graph of the pulse peak distribution output from the radiation detector when the γ-rays of FIG. 12 are input.

This reasoning will be described below. The pulse peak distribution observed when γ-rays of a single energy level $E_0$, shown in FIG. 10, enter the NaI (Tl) crystal, has the shape shown in FIG. 11, if it is assumed that there are no statistical fluctuations in the measurements. There is both a pulse peak value 81 when the single energy level $E_0$ is completely absorbed by the photoelectric effect, and a pulse peak region 82 which corresponds to a lower energy than the Compton edge energy $E_C$ generated by Compton scattering in the NaI (Tl) crystal. The γ-rays of the single energy level $E_0$ have a continuous energy distribution such as that shown in FIG. 12 after they have passed through the human body. If the γ-rays with the distribution of FIG. 12 enter the NaI (Tl) radiation detector, the pulse peak distribution, ignoring statistical fluctuations, has the shape shown in FIG. 13 (which exhibits the schematic tendency of the characteristics of FIG. 9). The count of pulse peaks less than the Compton edge energy $E_C$ is the sum of a component 83 due to Compton scattering in the NaI (Tl) crystal, as shown in FIG. 11, and a component 84, based on the pulses generated as a result of the Compton-scattered rays in the human body being subjected to Compton scattering in the NaI (Tl) crystal. On the other hand, the counted value 85 of pulse peaks corresponding to the region between the Compton edge energy $E_C$ and the photoelectric peak energy $E_0$ is obtained as a result of the energy of the γ-rays whose energy has been attenuated in the human body being completely absorbed. It is, therefore, desirable that the Compton component C is determined by using the count of pulse peaks in the region starting from the Compton edge energy $E_C$ which contains only the count resulting from the γ-rays that have passed through the human body. When the Compton component C is determined by using the count of pulse peaks within a region that does not start at the Compton edge energy $E_C$, the accuracy of determining the depth of the contaminated region is reduced by the influence of Compton scattering in the radiation detector 3.

The spectral index S is determined by dividing the area of the hatched region enclosed by the lines connecting the points d, e, f and g of FIG. 9 (i.e., the Compton component C), by the area of the hatched region enclosed by the lines connecting the points l, m and n of FIG. 9 (i.e., the photoelectric peak component P).

Figure 14:
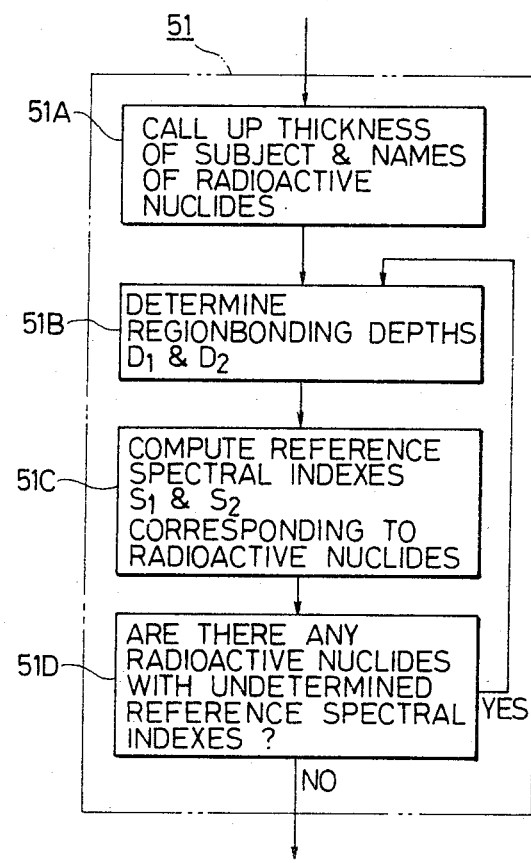
FIG. 14 is a flow chart of the reference spectral index computations of FIG. 3.
Figure 15:
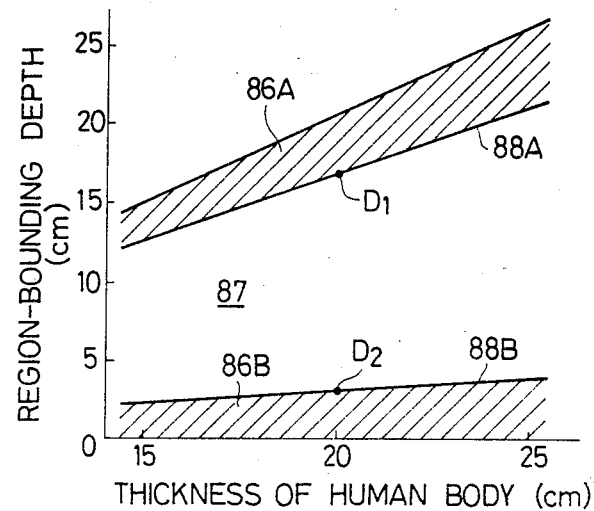
FIG. 15 is a characteristic graph showing the relationship between the thickness of the human body and the region-bounding depths.

After the computations of the spectral indexes S of Step 50 in FIG. 3 have ended, reference spectral indexes $S_1$ and $S_2$ are determined (Step 51). The computation of the reference spectral indexes $S_1$ and $S_2$ will now be described in detail with reference to FIG. 14. First of all, the thickness of the subject 1 is called up from the disk 22 to the central processing unit 16, and the names of the radioactive nuclides determined in Step 49D are input (Step 51A). The thickness of the subject 1 (i.e., the thickness of his body) was stored through the control panel 8 on the disk 22 after it had been measured separately. The standard values for judging the depth of the contamination position, i.e., the depths $D_1$ and $D_2$ of the boundary between the surface and the interior of the subject 1 (referred to as "region-bounding depths"), are determined from FIG. 15 so as to correspond to the thickness of the subject 1 (Step 51B). A region 87 is the internal region and regions 86A and 86B are the surface ones. The surface region 86A is located along the back and buttocks of the body whereas the surface region 86B is located along the chest and abdomen of the body. Straight lines 88A and 88B indicate the boundary depths between the surface regions 86A and 86B, respectively, and the internal region 87. The surface regions 86A and 86B include the parts such as the skin or subcutaneous fat in which radioactive substances are not easily stored, and the internal region 87 includes the internal organs such as the lungs and the digestive organs, the stomach, intestines and liver. Those regions store radioactive substances easily.

Generally speaking, internal contamination is caused by inhaling or swallowing dust containing radioactive substances. Therefore, the radioactive substances in the body are located in the respiratory and digestive organs. These organs are at certain spacings from the body surfaces (i.e., the upper surface of the skin). These spacings differ according to the physique, and especially to the thickness of the human body in the direction in which the radioactivity is measured. The height of a standard human body when the subject is lying down is about 20 cm, and the spacing from the organs to the body surface is about 3 cm (Edward M. Smith et. al.; J. Nuclear Medicine, Supplement No. 3, Vol. 10, August 1969). As has been described before, when the thickness of the human body is 20 cm, the surface region 86A is within a range of 0 to 3 cm, measured from the body surface into the body, and the surface region 86B is within a range of 17 to 20 cm, measured 3 cm from the back surface into the body. Surface contamination means that radioactive substances are present in the surface regions 86A and 86B, and internal contamination means that they are present in the internal region 87. The description thus far made is based upon the physique of a standard human body. When the human body being examined is not standard, however, the bounding depths between the surface regions and the internal region are determined by assuming that the ratio of the distance between the organs and the body surface to the thickness of the human body is equal to that in a standard human body.

Figure 16:
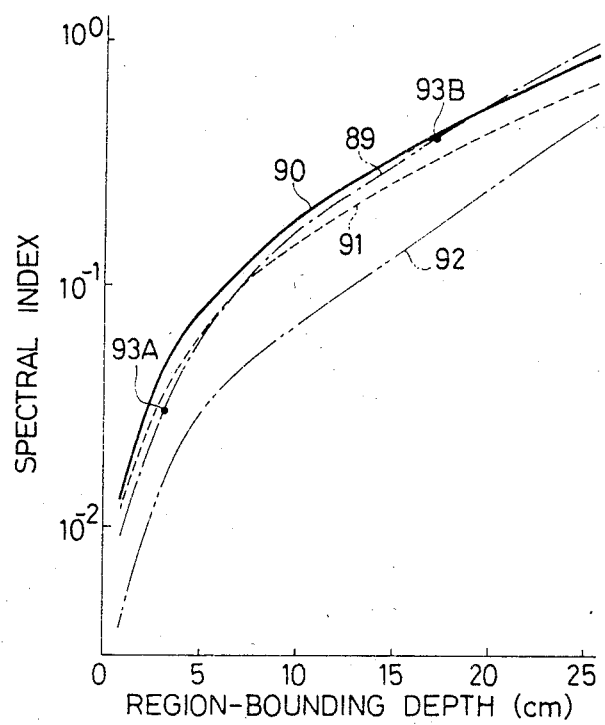
FIG. 16 is a characteristic graph of the relationship between the region-bounding depths and spectral index.

When the bounding depths $D_1$ and $D_2$ have been determined, the reference spectral indexes $S_1$ and $S_2$, respectively, are determined for each radioactive nuclide in Step 51C (see FIG. 14) in accordance with the characteristics of FIG. 16. These characteristics give the relationships between the spectral index values which have been determined in advance from the equation $S=P/C$, and the region-bounding depths. The characteristics are determined in advance. Characteristic curves 89, 90, 91, and 92 are the characteristics corresponding to the 0.662 MeV γ-rays emitted by $^{137}$Cs, the 1.17 MeV γ-rays emitted by $^{60}$Co, the 1.33 MeV γ-rays emitted by $^{60}$Co, and the 0.364 MeV γ-rays emitted by $^{131}$I, respectively. The relationships between the spectral indexes and the region-bounding depths, shown in FIG. 16 are for a NaI (Tl) radiation detector using a NaI (Tl) crystal of a thickness of 5 cm. Even for other radioactive nuclides such as $^{54}$Mn, characteristics similar to those of FIG. 16 can be obtained without any difficulty.

The standard spectral indexes $S_1$ and $S_2$ in Step 51C correspond to the region-bounding depths $D_1$ and $D_2$ obtained in Step 51B. First of all, a characteristic curve corresponding to a radioactive nuclide (determined in Step 49D) in the source of contamination of the subject 1 is selected from FIG. 16. The spectral indexes $S_1$ and $S_2$ corresponding to each of the region-bounding depths $D_1$ and $D_2$ are determined according to the characteristic curve selected. These spectral indexes become the standard spectral indexes. For example, when the thickness of the subject 1 is 20 cm, and the radioactive nuclide providing the source of contamination is $^{137}$Cs, the standard spectral index $S_1$ (or the region-bounding depth $D_1=3$ cm) has a value at a point 93A of FIG. 16, and the standard spectral index $S_2$ (or the region-bounding depth $D_2=17$ cm) has a value of a point 93B of FIG. 16. When the process in Step 51C ends, the presence of radioactive nuclides for which no standard spectral indexes $S_1$ and $S_2$ have been determined yet is detected (Step 51D). When there is such a radioactive nuclide, the processes of Steps 51B and 51C are repeated. When it is judged in Step 51D that all the standard spectral indexes for the radioactive nuclides have been determined, the process of Step 51 end, and the determination of the contamination region is then conducted (Step 52 of FIG. 3).

Figure 17:
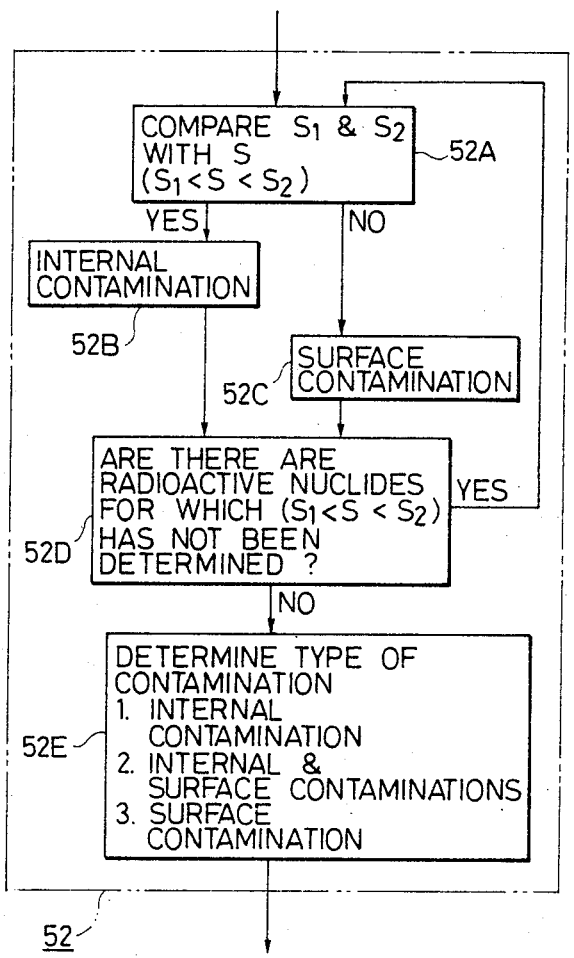
FIG. 17 is a flow chart of the contaminated region identification of FIG. 3.

The contents of Step 52 are shown in FIG. 17. For each radioactive nuclide, the spectral index S determined in Step 50D is compared with the standard spectral indexes $S_1$ and $S_2$ determined in Step 51C (Step 52A). When the conditions of Equation (4) below are satisfied, it is judged that the contamination by that radioactive nuclide is internal (52B), but when the conditions of Equation (4) are not satisfied, it is judged that it is surface contamination (52C):

$$S_1 < S < S_2 \qquad (4)$$

In the subsequent Step 52D, a decision is made as to whether there are radioactive nuclides whose positions have not yet been determined. If there are, the process of Step 52A is repeated for those nuclides. When the positions of all the radioactive nuclides in the contaminated regions have been determined, the mode of contamination of the subject 1 being examined is determined based on the results of Step 52A for each of the radioactive nuclides (Step 52E). In Step 52E, more specifically, internal contamination (the first mode), internal and surface contaminations (the second mode) and surface contamination (the third mode) are determined on the results of Step 52A. When the conditions of Equation (4) are satisfied for all the radioactive nuclides contaminating the subject 1, the contamination is determined to be internal contamination (first type). When the conditions of Equation (4) are not satisfied for all the radioactive nuclides, the contamination is determined to be surface contamination (third mode). When the conditions of Equation (4) are satisfied for some of the radioactive nuclides but not for the rest, the contamination is determined to be internal and surface contamination (second type). The end of the process of Step 52E ends that of Step 52, and the process of discriminating between surface and internal contaminations shown in FIG. 3 ends (Step 53). After that, the results of the discriminations are displayed on the display 31 and printed out by the line printer 30.

When the contamination is judged to be both internal and surface contamination (second type) or surface contamination alone (third type), the subject 1 goes to a shower room (not shown) to have a shower to clean his body surface and, as a result, wash away the radioactive nuclides contaminating his body surface. With surface contamination, the body surface of the subject is contaminated by radioactive nuclides, so that these radioactive nuclides can be easily removed by this treatment. Instead of a shower, a decontamination agent may be applied to the skin.

After this decontamination, the processes of Steps 40 to 44 are conducted again, if it is contamination of the third type, to confirm that the radioactive nuclides have been completely removed from the body surface. The processes of steps 40 to 52 are repeated if the contamination is of the second type, to confirm that the radioactive nuclides have been completely removed from the body surface.

An examination for determining the internal exposure dose is conducted after the end of this second examination when the contamination is of the second type, and after the end of the first examination when it is of the first type.

The method of determining the internal exposure dose will be explained in detail in the following. The deposited dose equivalent $H_{50,T}(T\leftarrow S)_{i,j}$ received from radioactive rays i emitted from a radioactive nuclide j present in a certain organ (e.g., a first organ) S in a body and acting as a source of radioactivity on a target organ (e.g., a second organ) T, is determined by the product of the number of total disintegrations within the organ S over fifty years and the dose equivalent received by the organ T for each disintegration. This is expressed by the following equation:

$$H_{50,T}(T\leftarrow S)_{i,j} = 1.6 \times 10^{-10} \times U_s \times SEE(T\leftarrow S)_{i,j} \qquad (5)$$

Where $U_S$ is the rate at which the radioactive nuclide acting as the source of radioactivity within the organ S disintegrates over fifty years after it has been absorbed. $SEE(T\leftarrow S)$ is the energy per unit weight absorbed by the target organ T when the radioactive nuclide acting as the source of radioactivity within the organ S disintegrates once, and which is compensated for by a quality factor (i.e., the specific effective energy: MeV/g). The factor $1.6 \times 10^{-10}$ is a constant for coverting MeV/g to J/kg.

When a plurality of radioactive nuclides are in the source organ S, $H_{50,T}(T\leftarrow S)_{i,j}$ is summed for all j. When the target organ T is irradiated by a plurality of source organs S, the $H_{50,T}(T\leftarrow S)$ is summed for each of the source organs S.

The value of SEE $(T\leftarrow S)$ for each of the organs has already been determined by Snyder et al., who conducted a large-scale Monte Carlo simulation for the MIRD Phantom, in which the shapes and three-dimensional arrangements of the respective organs were expressed mathematically on assumptions of the standard weight and atomic composition of the human organs (W. S. Snyder et al.; "A tabulation of dose equivalent per micro-curie-day for source and target organs of an adult for various radionuclides" ORNL - 5000; 1974).

From the description above, in order to determine the internal exposure dose, it is sufficient to estimate the number of disintegrations $U_S$ of radioactive nuclides in each organ. In the method of estimating the internal exposure dose proposed by the International Committee on Radiological Protection (the ICRP method), the internal migration from the intake to the excretion of a radioactive nuclide uses a metabolic model to determine the number of total disintegrations in each of the organs (ICRP Publication 30, "Limits for Intakes of Radionuclides by Works", part 1; Pergamon Press; Oxford; 1980). In that metabolic model, the organs or tissues which are part of the human metabolic process are divided into regions (or "compartments") having physiologically identical functions, and the internal behavior of radioactive substances is indicated as migration between the compartments. These compartments are not limited to a single physically separate organ such as the stomach or small intestine, but can be a plurality of finely separated organs with different excretion rates such as the lungs or liver. Blood is also taken to be one compartment.

The metabolic model considering such compartments is based on the following two assumptions:

(1) Radioactive nuclides are uniformly mixed and distributed when they pass into a compartment; and (2) The migration rate of radioactive nuclides between compartments is proportional to the total quantity of radioactive nuclides present (except for alkaline earth metals, e.g., Ca or Sr. These metals have a tendency to migrate toward bones so that their excretions are expressed, not by an exponential function, but by a power function of time t.) Moreover, there is assumed to be neither interactions between different radioactive nuclides nor changes in the migration velocity due to changes in the type of contamination during internal migration.

Figure 18:
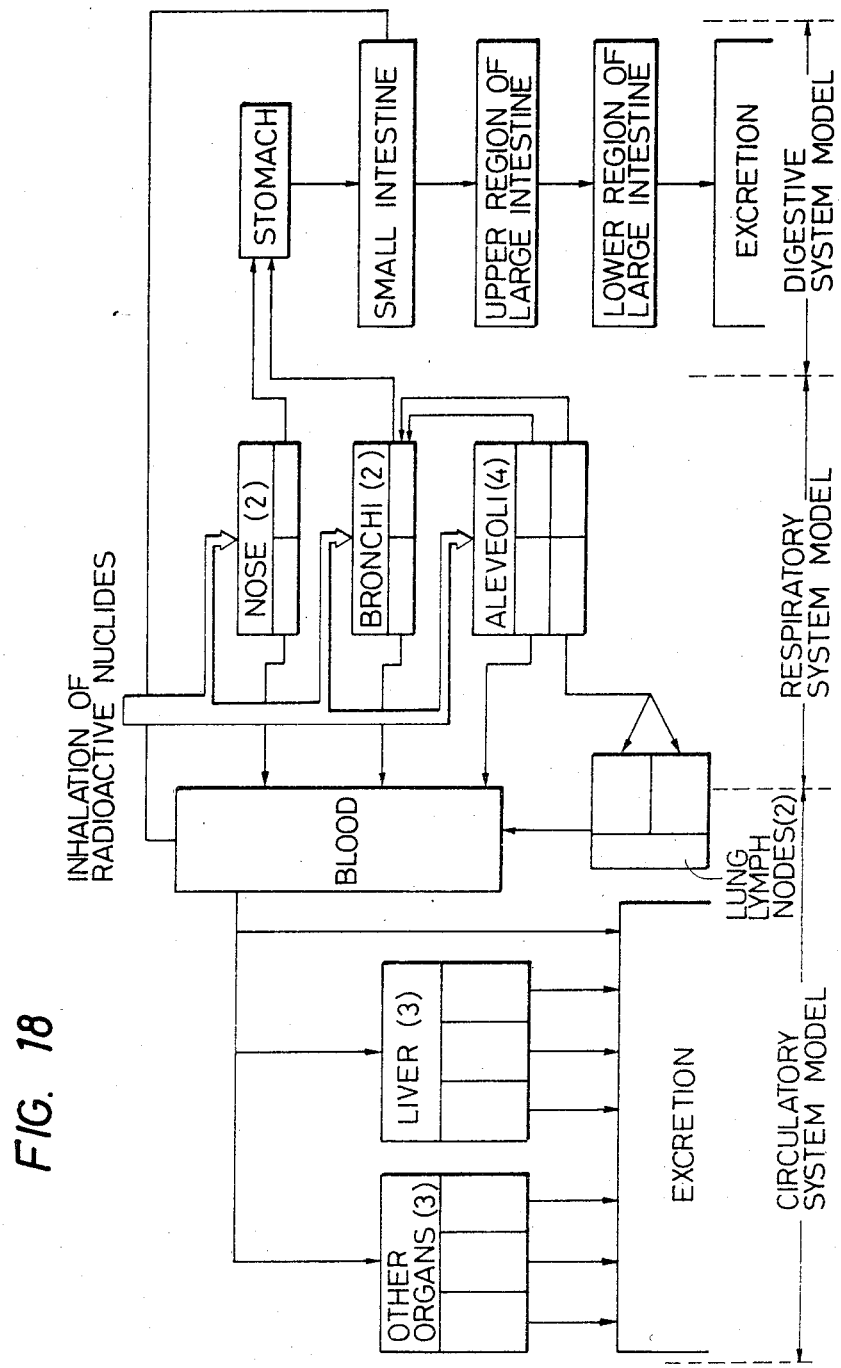
FIG. 18 is one example of a metabolic model.

An example of the metabolic model when dust containing $^{60}Co$ is inhaled as shown in FIG. 18. This model is roughly divided into a respiratory system model from the nose through the bronchi to the alveoli, a digestive system model from the stomach through the small intestine to the large intestine, and a circulatory system model of the process by which the excretion takes place through the blood. The numerals in parentheses beside each of the organs in FIG. 18 indicate the number of compartments within the same organ.

For intake by inhalation, the percentage of deposition in the tissues of each part of the respiratory system changes with the particle distribution of the dust inhaled. Moreover, the rate of migration rate from each type of tissues is dependent on the chemical forms of the radioactive nuclides. The deposited dust either migrates to the digestive system by transportation through mucus and by the ciliary movement of the surfaces of the respiratory tract, or dissolve into the blood through the cell walls of the contaminated tissues. Of the dust that migrates to the digestive system, a portion is absorbed by the small intestine and migrates into the blood, whereas the remainder is excreted through the large intestine out of the body. The absorption ratio from the small intestine is determined by the nuclide and its chemical form. After a nuclide has migrated into the blood through those steps, it follows a predetermined passage independent of its chemical form. Since it is presumed from animal experiments that $^{60}Co$ concentrates in the liver, the liver is separated and handled as independent compartments in the excretion passage from the blood. The other organs indicated in FIG. 18 are the organs of the circulatory system other than the liver. Of the radioactive nuclides migrating into the blood, incidentally, a portion is excreted by a process in which the time delay is negligible.

The input data necessary for the metabolic model includes: (1) the radioactive nuclides; (2) the intake of each of the radioactive nuclides; (3) the diameters of the dust inhaled; and (4) the chemical forms of the radioactive nuclides within the dust inhaled.

Figure 19:
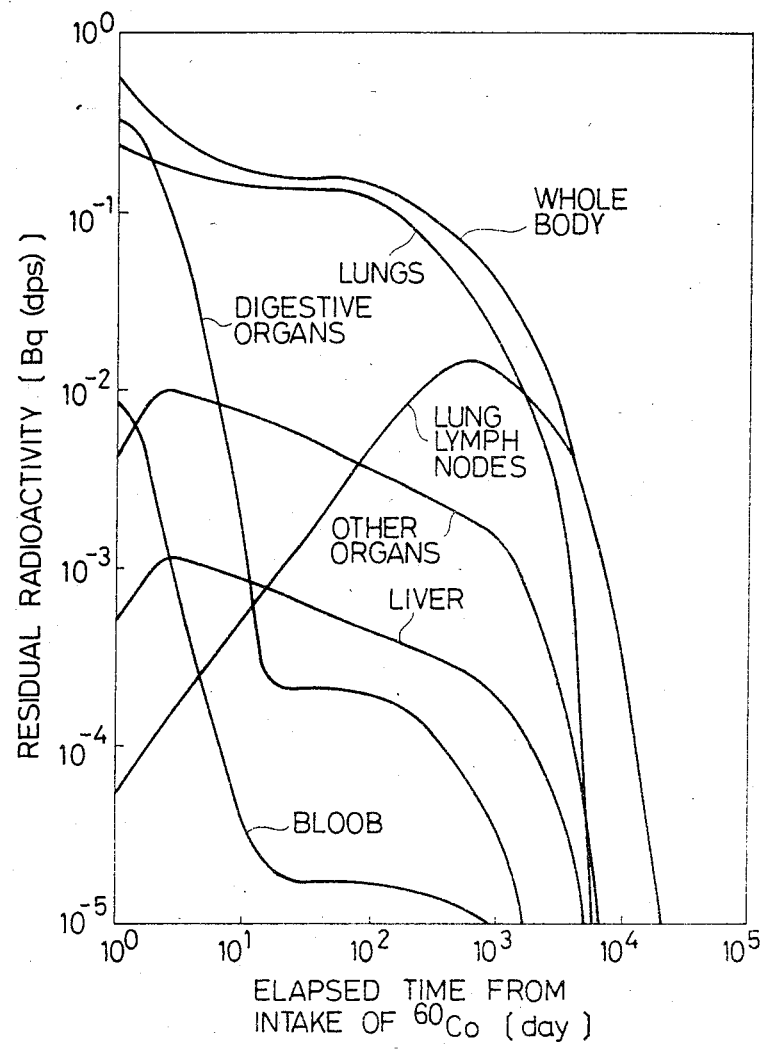
FIG. 19 is a characteristic graph of the relationship between elapsed time from the intake of $^{60}Co$ and the retained radioactivity in the body.

If the quantity of radioactive nuclides present within a certain compartment n is designated by $q_n(t)$ [Bq], the following differential equation based on the foregoing assumptions holds:

$$\frac{d}{dt} q_n(t) = -(\lambda_n - \lambda_R)q_n(t) + In(t) \tag{6}$$

where $\gamma_n$ is a rate constant [sec$^{-1}$] of biological excretion from the compartment n; $\gamma_R$ is a physical disintegration constant [sec$^{-1}$]; In(t) is the flow rate ($B_q \cdot sec^{-1}$) of radioactive nuclides into the compartment n during a unit period of time; and t is time [sec]. One example of the internal behavior of $^{60}Co$, obtained from the inventors' solution of Equation (6), is shown in FIG. 19. The characteristics of FIG. 19 correspond to the case in which 1 $B_q$ of oxides of $^{60}Co$ with a diameter of 1.0 μm were inhaled.

The manner of determining the internal exposure dose in accordance with the present embodiment using the metabolic model of the ICRP method thus far described will be explained in the following with reference to FIG. 4.

The subject 1, who has been judged to be internally contaminated by the radioactivity measurement based upon the steps of FIG. 3, lies down again on the bed 38. The operator then pushes a second start button on the control panel 8 to measure the radioactivity. This instruction is transmitted through the panel interface 24 to the central processing unit 16 which calls up a program stored in the ROM 18, as shown in FIG. 4, and determines the internal exposure dose of the subject 1 in accordance with that program. The data required includes the following: (1) the radioactive nuclides; (2) the intake of radioactive nuclides; (3) the diameters of the dust taken in; and (4) the chemical forms of the radioactive nuclides. The radioactive nuclides and their intakes are determined by measuring the retained radioactivity of the subject 1. The intake of radioactive nuclides is determined by extrapolating the retained radioactivity detected at the time of the measurement on the basis of the aging of the retained radioactivity in the whole body, which is obtained from the metabolic model. The elapsed time from intake to measurement can be determined by knowing the internal distribution if another parameter indicating the internal migration is known. The diameters of the dust and the chemical forms of the radioactive nuclides are difficult to measure directly because it is impossible to know accurately the time at which the subject 1 inhaled the radioactive nuclides. However those values can be determined in the following manner. The diameters of the dusts are assumed, in the absence of measured values, to be 1 μm from the activity median aerodynamic diameter (Kenji Takahashi: "Fundamental Aerosol Technology", p 129 to 132; 1972) in accordance with ICRP guidance. The chemical forms of the radioactive nuclides are assumed on the basis of the work environment of the subject 1. For example, if the subject 1 is engaged in the periodic inspection of the inside of the container of a boiling water nuclear power plant, the radioactive nuclides he would inhale are most probably composed mainly of corrosion products of structural materials. Since corrosion products of structural materials are oxides, it is possible to assume that the chemical forms of the radioactive nuclides are that of oxides. If the chemical forms of the radioactive nuclides are other than that of oxides, the internal migration rates of radioactive nuclides will be underestimated. However, this will lead to an overestimation of the internal exposure dose, so that this is a safe evaluation.

The computation of the internal exposure dose of the subject 1 will now be described in detail with reference to FIG. 4. First of all, the operator pushes the second start button and inputs the chemical forms of the radioactive nuclides inhaled by the subject 1 and the diameters of the dust through the control panel 8 to the central processing unit 16 (Step 54). This data is stored onto the disk 22. The connector 34 is connected to the contact 36, and the connector 39 is connected to the contact 35 (Step 55). Next, the central processing unit 16 sends an instruction to the drive mechanism 5 to move the truck 37 so that the radiation detector 3 is positioned at the top of the head of the subject 1 (Step 56). When the radiation detector 3 has been positioned, the truck 37 is moved slowly along the guide rail 32 toward the legs so that the radioactivity of the subject 1 is measured by the radiation detector 3 (Step 57). Simultaneously with this, the positions of the radioactivity measurements are located by the position detector 6, and position signals are stored through the control panel 8 onto the disk 22. The radioactivity signal which is the output from the radiation detector 3 is input as it is through the connector 34 to the central processing unit 16 and is stored on the disk 22. Simultaneously with this, the radioactivity signal is converted by the peak analyzer into peak values of the γ-ray energy spectrum, which is input to the central processing unit 16. These peak values are also stored on the disk 22 (Step 58). When the radiation detector 3 reaches the end of the legs of the subject 1, the drive mechanism 5 is stopped, and the measurement of the radioactivity ends (Step 59). The central processing unit 16 calls up the peak values of the γ-ray energy spectrum stored on the disk 22, and identifies the radioactive nuclides causing the internal contamination (Step 60). This identification of radioactive nuclides is conducted in the same way as the processes of Steps 49A to 49F of FIG. 7.

Assume that the contamination was judged to be internal contamination by $^{60}Co$ during the determination of surface and internal contaminations of FIG. 3, and that the radioactive nuclides causing the internal contamination is determined in Step 60 to be only $^{60}Co$ taking as an example computations on the internal exposure dose based upon internal contamination by $^{60}Co$, the manner of determining the internal exposure dose of the present embodiment will be described in detail in the following.

Figure 20:
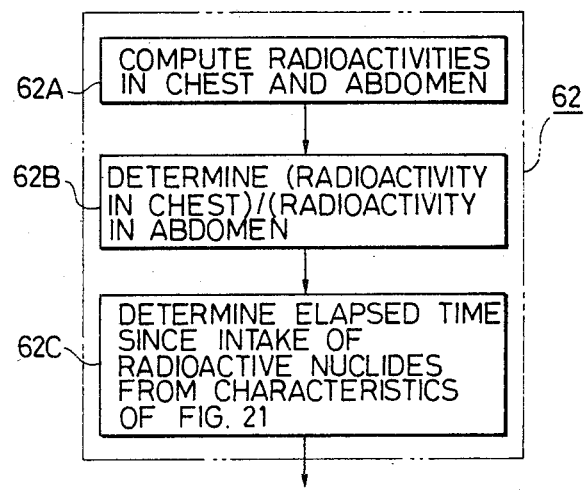
FIG. 20 is a flow chart of the computations of the elapsed time from the intake of the radioactive nuclides of FIG. 4.

The retained radioactivity (due to $^{60}Co$) over the whole body of the subject 1 at the time of measurement is determined on the basis of the radioactivity signals stored on the disk 22 (Step 61). In order to determine the intake of radioactive nuclides ($^{60}Co$) by the subject 1 on the basis of that retained radioactivity, it is first necessary to determine the elapsed time from the intake of the radioactive nuclides to the radioactivity measurement. This elapsed time can be determined in advance according to the work of the subject 1. The elapsed time from the intake of the radioactive nuclides can be determined by considering the distribution of radioactive nuclides in the body. This distribution is obtained from the signals output from the peak analyzer 13 during the measurement of the radioactivity over the whole body. More specifically, what radioactive nuclides are present and where they are can be known by observing the photoelectric peak energy $E_0$ over the whole body, and from the relationship with the positions of the radioactivity measurements. In Step 62, the elapsed time from the intake of the radioactive nuclides is determined. One example of Step 62 will now be explained with reference to FIG. 20.

The radioactivities in the chest and abdomen of the subject 1 are determined on the basis of the radioactivity signals measured in Step 56 and stored on the disk 22 (Step 62A). The ratio of the radioactivity in the abdomen to the radioactivity in the chest obtained (this ratio will be referred to as the "retained abdomen/chest radioactivity ratio") is determined (Step 62B). The residual radioactivity ratio of the chest and the abdomen maximizes the aging after the intake of the $^{60}Co$, found from Table 1:

TABLE 1

| Residual Radioactivity Ratio | Variation from 1st day to 90th day after intake (value after 90th day/value after 1st day) |
|---|---|
| (Abdomen)/(Chest) | $1.4 \times 10^{-5}$ |
| (Chest)/(Whole Body) | $4.8 \times 10^{-1}$ |
| (Abdomen)/(Whole Body) | $2.9 \times 10^{-3}$ |

Figure 21:
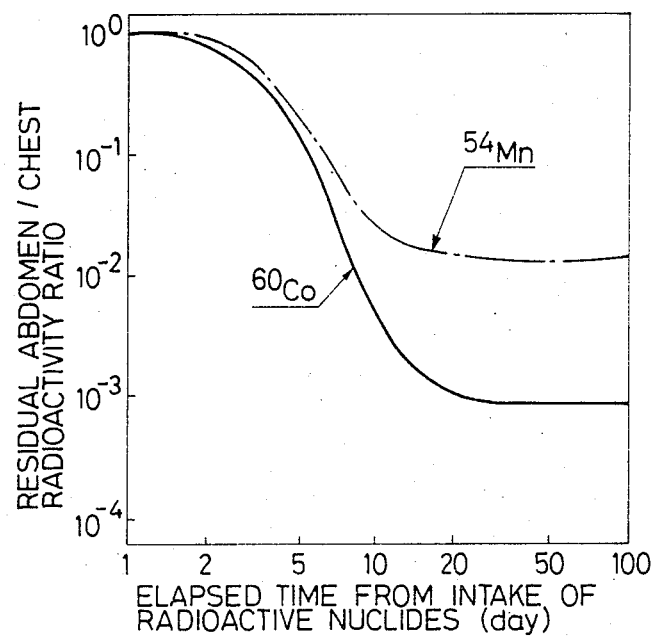
FIG. 21 is a characteristic graph of the relationship between the elapsed time from the intake of radioactive nuclides and the retained abdomen/chest radioactivity ratio.

This aging is not dependent upon the intake of $^{60}Co$. By determining the retained abdomen/chest radioactivity ratio, therefore, the elapsed time from the intake of $^{60}Co$ to the radioactivity measurement can be easily determined. Specifically, this elapsed time is obtained by determining the value corresponding to the retained abdomen/chest radioactivity ratio from the characteristics of FIG. 21 (Step 62C). The characteristics of FIG. 21 show the relationship between the elapsed time after the intake of $^{60}Co$ and the retained abdomen/chest radioactivity ratio.

$^{54}Mn$ has the same characteristics as those of $^{60}Co$. In order to determine the elapsed time from intake, the characteristic curves shown in FIG. 21 are automatically selected in accordance with the radioactive nuclides identified in Step 60, and which is the source of internal contamination of the subject. When there is a plurality of radioactive nuclides acting as the source of contamination in the body, it is generally assumed that those radioactive nuclides were taken in simultaneously. Therefore, it is sufficient to determine the ratio of (radioactivity in the abdomen)/(radioactivity in the chest) for any of the radioactive nuclides.

The intake of radioactive nuclides is determined on the basis of the elapsed time from the intake of the radioactive nuclides, and the retained radioactivity detected at the time of the radioactivity measurement (Step 63). The characteristics showing the relationships between the elapsed time from the intake of the radioactive nuclides and the retained radioactivity, which satisfy the conditions for the radioactive nuclides input in Step 60, and the diameter of the dust and the chemical forms of the radioactive nuclides both input in Step 54 (these characteristics will be referred to as the "retained radioactivity characteristics" of FIG. 19, for example), are located on the disk 22 (or the magnetic tape 20). These retained radioactivity characteristics are determined in various ways in advance from the radioactive nuclides, the diameters of the dust, and the chemical forms of the radioactive nuclides as parameters, and are stored on the disk 22 (or the magnetic tape 20). It is usually sufficient in practice to determine the retained radioactivity characteristics for each radioactive nuclide. This is because it will provide a safe evaluation if the dust diameter is 1 μm and if the chemical form is an oxide. The retained radioactivity characteristics can be computed each time on the basis of Equation (6) from these three parameters, without storing them on the disk 22, as has been described hereinbefore.

In the present embodiment, it is assumed that the dust diameter is 1 μm and that the chemical form is an oxide. The radioactive nuclides inhaled are $^{60}$Co, as identified in Step 60. As a result, the characteristics shown in FIG. 19 are located from the disk 22. The retained radioactivity corresponding to the elapsed time (from the intake of the radioactivity to the measurement), which has been computed in Step 62, is determined from the characteristic curves for the whole body shown in FIG. 19. The ratio between this retained radioactivity (for an intake of 1 $B_q$) and the actual measured value of retained radioactivity of the whole body, which is obtained from the radioactivity signals measured by the radiation detector 3, is determined. The intake of $^{60}$Co is determined by extrapolating from that ratio with the characteristic curves for the whole body shown in FIG. 19.

The intake of radioactive nuclides determined in this manner, the radioactive nuclides themselves, and the diameter of the dust, and the chemical forms of the radioactive nuclides are applied to the metabolic model of FIG. 18 to determine the number of total disintegrations in each organ (Step 64). Specifically, this number is obtained by integrating the function indicating the changes with time of the retained radioactivity in each organ (this function is obtained as a solution to Equation (6). The specific effective energy SEE (T←S) for each organ corresponding to each radioactive nuclide is determined (Step 65). This specific effective energy SEE (T←S) is stored on the disk 22. The specific energy SEE (T←S) is specifically evaluated in the Reference "ORNL-5000" of Snyder et al. (p 196 for $^{60}$Co). The number of total disintegrations $U_S$ and the specific effective energy SEE (T←S) thus obtained are substituted into Equation (5) to determine the deposited dose equivalent $H_{50,T}$ (T←S)$_{i,j}$ for the organ under consideration. The internal exposure dose of the subject 1 is determined by summing the products of the deposited dose equivalents $H_{50,T}$ (T←S)$_{i,j}$ for each organ in the body, and a load factor $W_T$ for each organ (Step 66). More specifically, the internal exposure dose (called the "effective dose equivalent") $H_E$ is determined from the following equation:

$$H_E = \sum_T W_T \cdot H_{50,T}(T \leftarrow S) \tag{7}$$

This takes into consideration the fact that organs are influenced in different ways by the same dose of radioactivity. Values of the load factor $W_T$ are tabulated in Table 2:

TABLE 2

| Organ | $W_T$ | Organ | $W_T$ |
| --- | --- | --- | --- |
| Sexual organs | 0.25 | Thyroid Gland | 0.03 |
| Breasts | 0.12 | Bone Surfaces | 0.03 |
| Red Marrow | 0.12 | Others* | 0.3 |
| Lungs | 0.12 | — | |

Note: *indicates a selection of five organs with high doses.

When there two or more kinds of radioactive nuclides providing the source of contamination, the true internal exposure dose can be determined by summing the internal exposure doses of each of the radioactive nuclides. This process ends the computation of the internal expose dose of the subject 1. The internal exposure dose thus computed is printed out by the line printer 30 and displayed on the display 31.

Since a judgement is conducted on the basis of the Compton components C and the photoelectric peak components P in the present embodiment, internal and surface contaminations can be accurately discriminated when a subject 1 is contaminated by radioactivity. Therefore, the subsequent treatment of the subject can be properly conducted. When internal and surface contaminations are identified, moreover, all that is done to the subject 1 is a measurement of radioactivity. This shortens the time period during which the subject 1 is restricted. In particular, it is sufficient to measure the radioactivity at the peak positions of the radioactivity at the contamination position in the longitudinal direction of the subject. This also reduces markedly the time taken by the measurement of radioactivity to discriminations. The computational processing for the discrimination is so simple that a judgement can be obtained within a short period of time. As a result, contamination can be identified within a short period of time even when several people are contaminated by radioactivity.

When internal contamination has been determined in the discrimination between internal and surface contaminations, a new radioactivity measurement is conducted to determine the internal exposure dose. This means that an internally contaminated subject is not restricted for a long period of time for the examination, and shortens the examination time for all the contaminated people. This is because, in order to determine the internal exposure dose, it is necessary to determine the distribution of radioactive nuclides in the body when the elapsed time from the intake of the radioactivity is unknown, and because a peak analysis of the radioactivity signals for the whole body must be executed. In particular, when there is only a little radioactivity present in the body of the subject, it would take a long time to execute a peak analysis of the radioactivity signals for the whole body. As a result, when both internal and surface contaminations have been identified, the execution of the peak analysis of the radioactivity signals for the whole body to determine the internal exposure dose is also applied to a surface-contaminated person who would require no peak analysis. In the present embodiment, this problem is eliminated so that the radioactivity measurement can be made more efficient. Even for a subject who is contaminated both internally and on the surface by radioactivity, in the present embodiment the contaminations can be clearly identified. In this case, it is possible to execute a radioactivity measurement to determine the internal exposure dose after any radioactive nuclides causing surface contamination have been decontaminated by a shower or the like. As a result, the internal exposure dose can be accurately determined when the influence of the radioactivity of surface contamination has been removed.

The elapsed time from the intake of radioactive nuclides can be determined simply but accurately on the basis of the residual abdomen/chest radioactivity ratio. As a result, the intake of radioactive nuclides can be easily computed.

Next, another example of determining the spectral index S providing a reference for discriminating between internal and surface contaminations will be described below.

Figure 22:
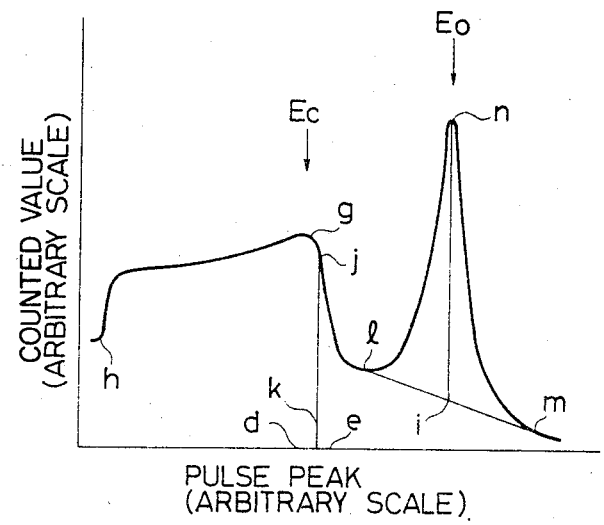
FIGS. 22 and 23 are graphs of methods of other embodiments for computing the Compton component C and the photoelectric peak component P.

FIG. 22 illustrates the determination of the Compton component C and the photoelectric peak component P providing the basis of computations of the spectral index S, by the use of a single pulse peak value. Specifically, the Compton component C is a computed value which is expressed by the length of the line jk which is a perpendicular from the midpoint k of the line connecting the points d and e of FIG. 9. The photoelectric peak component P is a computed value which is expressed by the length of the line in of a perpendicular to the abscissa extending from the point n (i.e., the peak value of the photoelectric peak energy $E_0$). The point i is the intersection between the straight line lm and the perpendicular through the point n. By dividing the Compton component C thus obtained by the photoelectric peak component P, the spectral index S can be determined. In this case, the characteristic curves shown in FIG. 16 will have to be prepared again on the basis of the new spectral index and the region-bounding depths obtained on the basis of the above definitions.

In yet another embodiment of determining the spectral index S, the area of the hatched region enclosed by the lines connecting the point l, m and n of FIG. 9, can be taken as the photoelectric peak component P, and the area of the region with a width corresponding to the half-value width (i.e., the energy width at a point where the energy is half the peak value) of the photoelectric peak energy $E_0$ to the right of the line dg, and based upon the line dg, can be used as the Compton component C.

Figure 23:
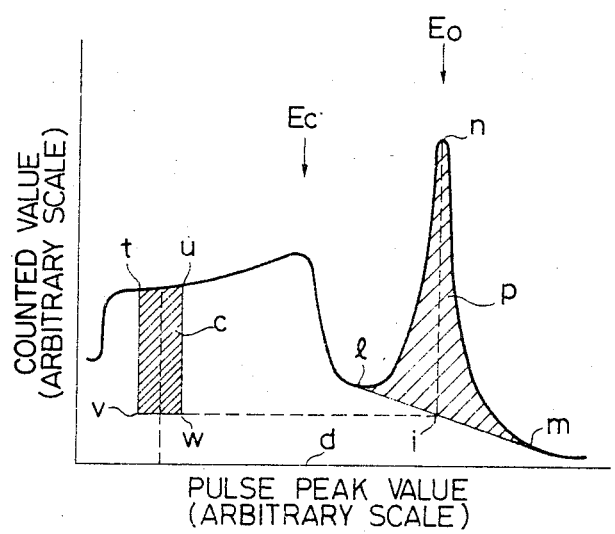

A further embodiment is shown in FIG. 23. The photoelectric peak component P in the present embodiment is expressed by the area of the hatched region enclosed by the lines connecting the point l, m, and n, in the same way as in FIG. 9. The Compton component C is determined on the lower-energy side of the Compton edge (the point d) and on the higher-energy side of point h. In other words, the Compton component C is expressed by the area of the hatched region which is enclosed by the lines connecting points t, u, v, and w of FIG. 23. The points v and w are at the same level as the level computed for point i. The width vw is the level computed for point i. The width vw is the half-value width of the photoelectric peak energy $E_0$. None of the embodiments thus far described are influenced by Compton scattering in the radiation detector because the Compton component C is determined in a higher energy region than that of the Compton edge. As a result, the spectral index S can be accurately determined. However, the present embodiment has an increased error because the Compton component is determined in an energy region lower than the Compton edge at which Compton scattering occurs in the radiation detector.

According to the present invention, surface and internal contaminations can be clearly identified.

What is claimed is:

1. A method of measuring radioactivity, comprising the steps of:
    measuring the radioactivity of a subject to obtain a γ-ray energy spectrum of radioactivity signals;
    determining a photoelectric effect component and a Compton-scattered component of said γ-ray energy spectrum; and
    performing a discrimination between surface and internal contamination of said subject on the basis of the ratio between said photoelectric effect component and said compton scattered component of said γ-ray energy spectrum.

2. A method of measuring the radioactivity according to claim 1, wherein the radioactive nuclides of a source of contamination are identified on the basis of the photoelectric peak energy of said γ-ray energy spectrum.

3. A method of measuring the radioactivity according to in claim 1, wherein said Compton-scattered component is determined on the higher-energy side of the Compton edge of said γ-ray energy spectrum.

4. A method of measuring the radioactivity according to in claim 2, wherein said Compton-scattered component is determined on the higher-energy side of the Compton edge of said γ-ray energy spectrum.

5. A method of measuring radioactivity, comprising the steps of:
    measuring the radioactivity of a subject to obtain a γ-ray energy spectrum of radioactivity signals;
    determining a photoelectric effect component and a Compton-scattered component of said γ-ray energy spectrum; and
    performing a discrimination between surface and internal contamination of said subject on the basis of the ratio between said photoelectric effect component and said Compton-scattered component of said γ-ray energy spectrum so that the internal exposure dose of said subject can be determined in the base of internal contamination.

6. A method of measuring the radioactivity according to claim 5, wherein the radioactive nuclides of a source of contamination are identified on the basis of the photoelectric peak energy of said γ-ray energy spectrum.

7. A method of measuring the radioactivity according to claim 5, wherein said Compton-scattered component is determined on the higher-energy side of the Compton edge of said γ-ray energy spectrum.

8. A method of measuring the radioactivity according to claim 6, wherein said Compton-scattered component is determined on the higher-energy side of the Compton edge of said γ-ray energy spectrum.

9. A method of measuring the radioactivity according to claim 5, wherein the radioactivity is again measured in the longitudinal direction of said subject when internal contamination has been identified to determine said internal exposure dose on the basis of the radioactivity signals measured.

10. A method of measuring the radioactivity according to claim 9, wherein said internal exposure dose is determined on the basis of both the radioactive nuclides, determined in a manner which corresponds to the photoelectric peak energies of the γ-ray energy spectrum of said re-measured radioactivity signals, and the intake of said radioactive nuclides by said subject, obtained from said re-measured radioactivity signals.

11. A method of measuring the radioactivity according to claim 10, wherein the elapsed time since said radioactive nuclides were taken in is determined from the distribution of said radioactive nuclides in said subject, obtained on the basis of the position of the measurements and said radioactive nuclides both detected simultaneously with said radioactivity measurement, so that the intake of said radioactive nuclides is determined from both the retained radioactivity in said subject, obtained from said re-measured radioactivity signals, and said elapsed time.

12. A method of measuring the radioactivity according to claim 1, wherein an initial measurement is performed to determine a radioactive level distribution in the subject, said radioactive level distribution is compared with a predetermined normal level of radioactivity, and contamination of the subject by radioactive substances is determined based upon the comparison of the predetermined normal level of radioactivity and said initial measurement.

13. A method of measuring the radioactivity according to claim 12, wherein said initial measurement is performed prior to said measuring the radioactivity of a subject to obtain a γ-ray energy spectrum.

14. A method of measuring the radioactivity according to claim 1, wherein said discrimination is performed by comparing said ratio with reference values for a suface region and an internal region of said subject.

15. A method of measuring the radioactivity according to claim 5, wherein an initial measurement is performed to determine a radioactive level distribution in the subject, said radioactive level distribution is compared with a predetermined normal level of radioactivity, and contamination of the subject by radioactive substances is determined based upon the comparison of the predetermined normal level of radioactivity and said initial measurement.

16. A method of measuring the radioactivity according to claim 15, wherein said initial measurement is performed prior to said measuring the radioactivity of a subject to obtain a γ-ray energy spectrum.

17. A method of measuring the radioactivity according to claim 5, wherein said discrimination is performed by comparing said ratio with reference values for a surface region and an internal region of said subject.

18. A method of measuring the radioactivity according to claim 5, wherein the subject includes a plurality of radioactive nuclides, each having a γ-ray energy spectrum; wherein the step of determining includes determining said photoelectric effect component and said Compton-scattered component of the γ-ray energy spectrum for at least one of said radioactive nuclides; and the step of performing a discrimination includes performing said discrimination on the basis of the ratio between the photoelectric effect component and the Compton-scattered component of the γ-ray energy spectrum for said at least one of said radioactive nuclides.

19. A method of measuring the radioaactivity according to claim 18, wherein the determining step and performing a discrimination step are performed for each of the plurality of radioactive nuclides.

20. A method of measuring the radioactivity according to claim 18, wherein the step of performing a discrimination includes selecting reference values, for a surface region and an internal region of said subject, for said at least one of said radioactive nuclides, and comparing said ratio, with the selected reference values, for said at least one of said radioactive nuclides.

* * * * *